Dec. 2, 1952 W. E. ROSENBAUM 2,620,079
TRANSPORTATION UNIT CONSTRUCTION
Filed Oct. 5, 1946 3 Sheets-Sheet 1
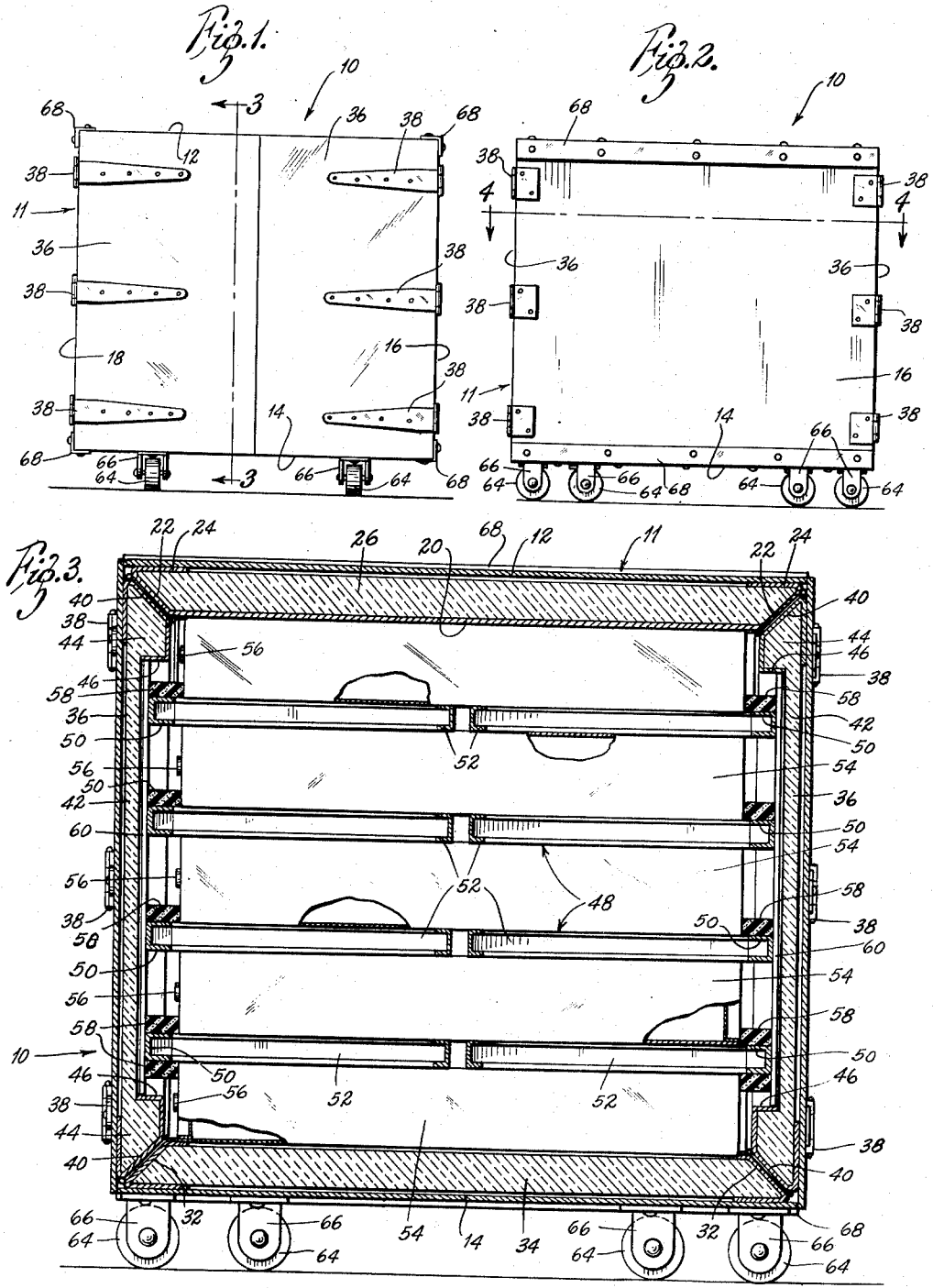
INVENTOR:
WILLIAM E. ROSENBAUM,
BY Kingsland, Rogers & Ezell
ATTORNEYS.

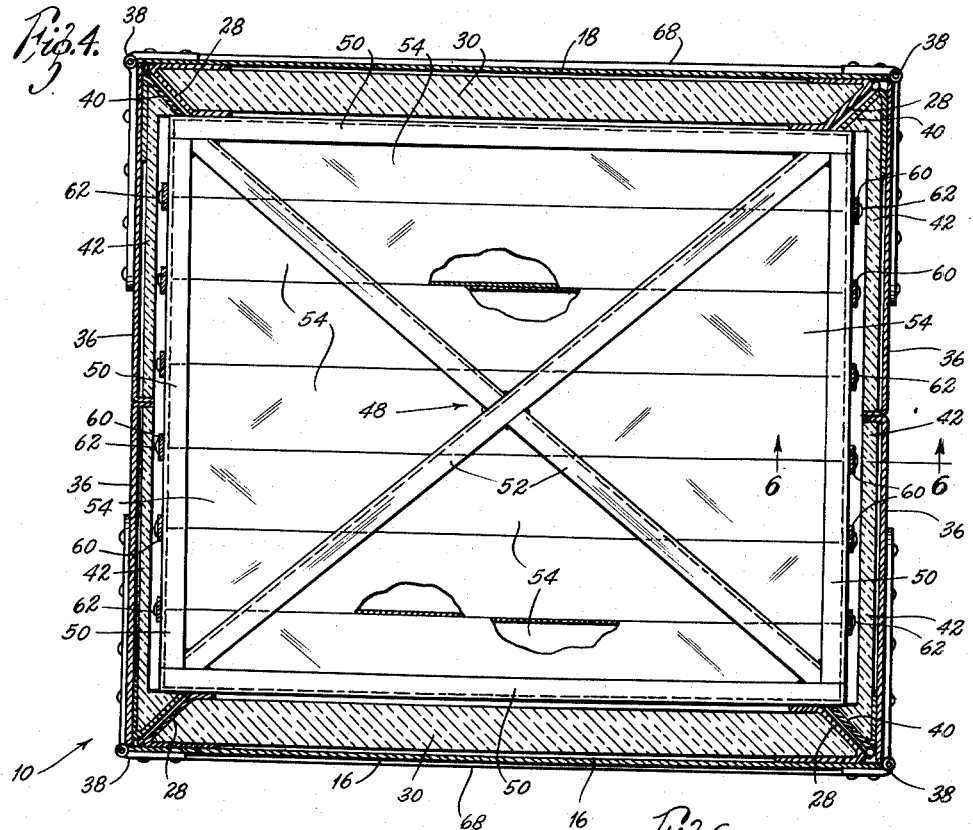

Dec. 2, 1952 W. E. ROSENBAUM 2,620,079
TRANSPORTATION UNIT CONSTRUCTION
Filed Oct. 5, 1946 3 Sheets-Sheet 3
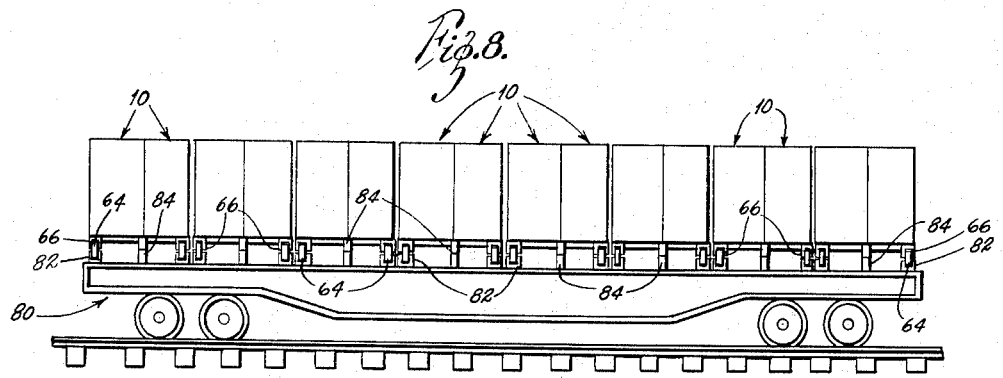
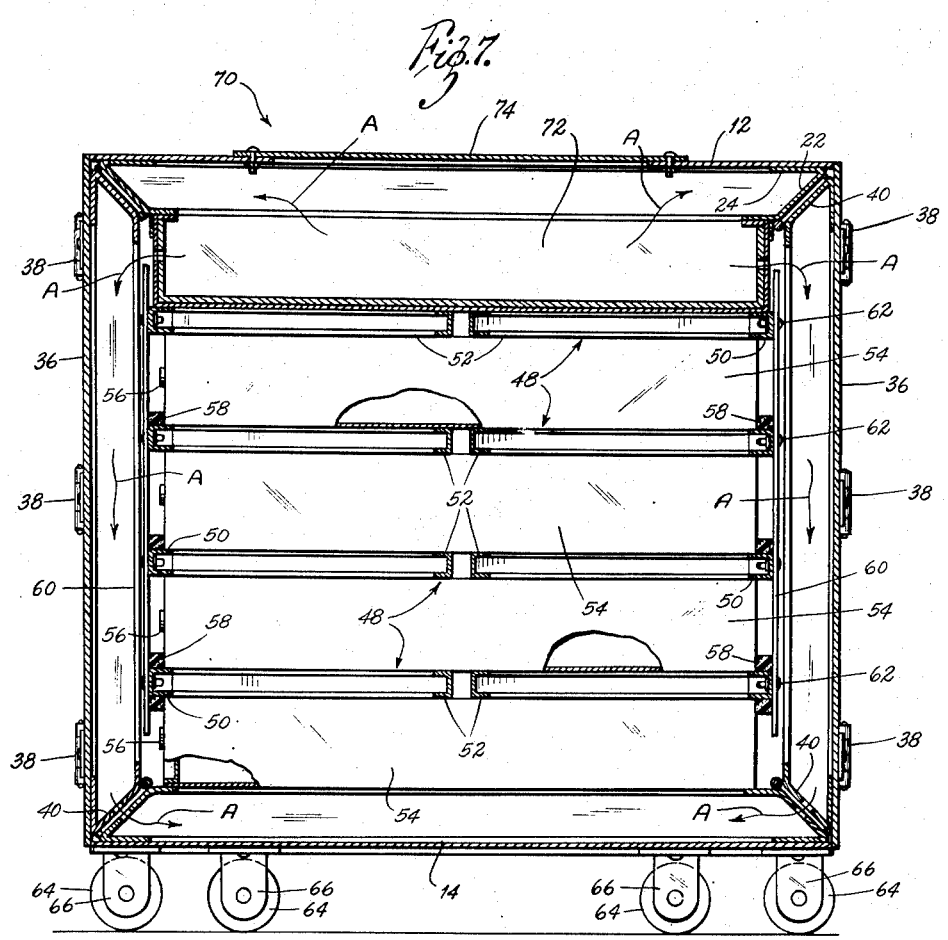
INVENTOR:
WILLIAM E. ROSENBAUM,
BY Kingsland, Rogers & Ezell
ATTORNEYS.

Patented Dec. 2, 1952

2,620,079

UNITED STATES PATENT OFFICE 2,620,079

TRANSPORTATION UNIT CONSTRUCTION

William E. Rosenbaum, Clayton, Mo.

Application October 5, 1946, Serial No. 701,484

1 Claim. (Cl. 220—1.5)

The present invention relates generally to transportation units, so designed as to become, in carrier or transportation language, integral parts of various types of vehicles, and more particularly to a transportation unit which incorporates a plurality of subunits adapted to individually receive and transport selected freight or cargo. By making the units integral parts of vehicles, the superstructures thus provided are thereby made to consist of multiple units; for example, a freight car, instead of consisting of a single unit, is thereby made a multiple unit car.

There has long existed a need for an improved transportation unit for the bulk transportation of beer and other liquids, as well as flour, carbon black, lime, cement, and other pulverized commodities, in coordinated service in different forms of transport, such as rail, motor truck, and water. Sanitation, refrigeration, and other requirements prohibit the transportation of beer and other commodities by means of motor trucks and freight cars equipped with large single unit tank bodies.

Therefore, it is an object of the present invention to provide a novel transportation unit to become an integral part of a freight car, motor truck, barge, steamship, or other vehicle, and which is adapted to transport beer and other commodities in bulk by rail or other carrier, as well as in coordinated rail-truck-water transportation service.

Another object is to provide a novel transportation unit which incorporates a plurality of subunits, each adapted to receive its individual freight or cargo for movement by rail or other carrier.

A further object is to provide a transportation unit which will permit of interchange from one type of vehicle or form of transport to another without the handling of the commodities carried therein in effecting such interchange, thereby permitting of a reduction in costs of loading and unloading and eliminating expenses ordinarily incurred in the loading and unloading of freight cars at loading platforms and docks, inasmuch as the aforesaid units will be so constructed as to permit of the complete units and their contents to be moved from the understructures of freight cars or motor trucks, for example, into warehouses, or vice versa.

Another object is to provide a novel transportation unit which is constructed for the movement by rail, motor truck, or water transport in coordinated service or otherwise in bulk of liquids and other commodities which heretofore could not be so moved.

Another object is to provide a means of transport whereby the lading will be transported in compact units eliminating the necessity for blocking and bracing ordinarily required in so-called box cars of greater length and width where lading is susceptible to damage caused by rough handling as an incident to shocks from sudden stopping and starting of freight trains in switching and other operations.

Another object is to provide a novel refrigeration transportation unit constructed to become an integral part of a freight car, motor truck, or other vehicle.

Other objects are to provide a novel transportation unit which is sturdy in construction and capable of sustained service even through rough usage, which is fabricated to permit repair and replacement of the several subunits thereof, which permits efficient and economical shipment of cargo, and which facilitates the movement by rail or other carrier of small lots of a plurality of different types of freight or cargo without confusion thereof and without damage thereto.

The foregoing and other objects and advantages are apparent from the following description taken with the accompanying drawings, in which:

Fig. 1 is an end elevational view of a transportation unit constructed in accordance with the teachings of the present invention;

Fig. 2 is a side elevational view thereof;

Fig. 3 is an enlarged vertical cross-sectional view taken on the line 3—3 of Fig. 1;

Fig. 4 is an enlarged horizontal cross-sectional view taken on the line 4—4 of Fig. 2;

Fig. 5 is an end elevational view thereof with one pair of doors open and broken away to conserve space, showing the ends of the subunits and the securing means therefor;

Fig. 6 is an enlarged fragmentary vertical cross-sectional view taken on the line 6—6 of Fig. 4;

Fig. 7 is an enlarged vertical cross-sectional view similar to Fig. 3 showing a modified transportation unit; and Fig. 8 is a diagrammatic side elevational view of a multi-unit railway car incorporating the present invention.

Referring to the drawings more particularly by reference numerals, 10 indicates generally a transportation unit embodying the concepts of the present invention. The unit 10 is of a size to ride upon and to be an integral part, in carrier language, of a motor truck, a trailer or semi-trailer, a railway car or skeletonized car particularly prepared for it, and is of an over-all rectangular shape to facilitate the mounting of a maximum number of units 10 upon a single mobile support.

The unit 10 includes a master or main body or frame 11 having an exterior top panel 12, an exterior bottom panel 14, and exterior side panels 16 and 18. An interior top panel 20 is formed with sloping portions 22 and a flange 24, the latter being secured to the top panel 12 by welding or the like. Insulation 26 is disposed between the panels 12 and 20. Each of the side panels 16 and 18 has secured thereto along the ends thereof and along the top and bottom edges members 28 of the cross section disclosed in the drawings (Fig. 4), which may be formed as a unitary member. Insulation 30 is contained between the four members 28. Horizontally disposed members 32 of the cross section shown in the drawings are connected to the bottom panel 14 around the periphery thereof. The four members 32 may be formed as a single substantially square member of the cross section shown, if desired. Insulation 34 is disposed within the members 32.

At each end of the unit 10 is a double swinging door comprising two door halves 36, each of which is pivoted on three hinges 38.

The sloping portion 22 and the members 28 and 32 form frames of substantially 45° inward slope to receive the two pairs of door halves 36, as is clear from Fig. 5. As is clearly shown in Fig. 3, each door half 36 is formed to include a sloping portion 40 which extends along the hinge side, the top and the bottom thereof, and is of the same degree of slope as the portion 22 and the members 28 and 32. Insulation 42 is maintained in place against the door halves 36 by bottom and top portions 44 and integral inwardly directed flanges 46.

Platforms 48 are provided for a purpose set forth below, four such platforms 48 being shown. Each platform 48 includes four channel members 50 secured together to form a rectangular outline and diagonally disposed channel members 52 secured thereto. The channel members 50 and 52 are welded or otherwise secured together to form a rigid platform 48.

In the particular transportation device 10 shown in the drawings, five tiers of seven subunits 54 are disposed within the main body 11 formed by the aforesaid wall construction. Each subunit 54 is an elongated tank of metal or other suitable material having a filler cap 56 at one end. It is manifest from Fig. 5 that seven tanks 54 rest on the bottom of the main body 11 and that seven tanks 54 rest on each platform 48. The platforms 48 are used as separation planes for the tanks 54 and are freely disposed on a tier thereof in loading the main body 11. If preferred, the platforms 48 may be secured by welding or the like to the upstanding members 28.

In order to maintain the tanks 54 in place during carrier movement or other movement of the unit 10, a bumper 58 of suitable resilient material, such as rubber, is disposed at each end of each tier of tanks 54. A plurality of tank stays 60 maintain the bumpers 58 is place, being secured to the end channel members 50 by removable securing assemblies 62 (Fig. 6). The bumpers 58 may be secured to the tank stays 60 if desired.

Wheels 64 are secured to the bottom panel 14 by U-shaped bearing brackets 66. Preferably, four pairs of wheels 64 are used to facilitate transfer between carriers or platforms. The brackets 66 may be swiveled, if desired, to facilitate maneuver of the unit 10.

Reenforcing angle irons 68 may be employed (Figs. 1 and 2), if desired, although the construction described above is very sturdy.

In Fig. 7 there is disclosed a modified unit 70 which is similar to the unit 10, but which differs therefrom in several particulars. An open tank 72 replaces the top tier of tanks 54 which is adapted to contain Dry Ice, or the like, and which is open at the top. No insulation is included interiorly of the panels 12, 14, 16 and 18, but the space therebehind communicates with the tank 72 and receives cooling gas from the Dry Ice, as is indicated by the arrows A. A removable hatch 74 is provided for the insertion of Dry Ice and the like.

In Fig. 8, units 10 are shown integrated with a wheeled base 80, the units 10 resting on transverse tracks 82 and being restrained in place by clamps 84, or the like.

It is manifest that there has been provided a transportation unit which may be employed to transport liquid or other freight in small separated increments. Each tank 54 comprises a separate carrier unit which facilitates handling of the freight or cargo. The tanks 54 may be individually removed in the handling of freight, or for repairs, or for other purposes. It is to be understood that the filler cap 56 and its aperture may be of any size to and including the full cross-sectional area of the end of the tank 54, which would be the case for some freight, although the small cap 56 shown in adequate for liquid freight, the handling of which is one of the main objects of the present invention. If desired, individual tank stays may be employed, instead of the tank stays 60 shown, to reduce the fastener release work where it is desired to remove only one or two tanks 54.

It is apparent that there has been provided a novel transportation unit which fulfills all the objects and advantages sought therefor.

It is to be understood that the foregoing description and the accompanying drawings have been given by way of illustration and example.

It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

A transportation unit comprising a main body including a floor, side walls, and a top, a plurality of horizontal vertically spaced platforms in said main body dividing the interior thereof into a plurality of spaces, wall elements in said main body supporting said platforms, a plurality of removable subunits formed as closed shipping containers disposed in said main body in tiers, said subunits being individually removable without movement of the other subunits and being interiorly accessible for the inserting and removal of freight, the lowest tier being disposed on the floor of the main body and the other tiers being supported by said platforms, and removable means securing said subunits against reciprocable movement during use of said unit comprising removable elongated resilient spaced members engaging the ends of selected groups of subunits and releasable straps engaging said resilient members and maintaining the same in use positions.

WILLIAM E. ROSENBAUM.

REFERENCES CITED

The following references are of record in the file of this patent:

UNITED STATES PATENTS

| Number | Name | Date |
|---|---|---|
| 672,966 | Sheldon | Apr. 30, 1901 |
| 698,935 | Hagestad | Apr. 29, 1902 |
| 1,126,315 | Terry | Jan. 26, 1915 |
| 1,693,607 | Kellett | Dec. 4, 1928 |
| 1,765,591 | Kellett | June 24, 1930 |
| 1,793,118 | Moores | Feb. 17, 1931 |
| 1,836,750 | Daly | Dec. 15, 1931 |
| 1,864,259 | Small | June 21, 1932 |
| 1,870,685 | Lockwood | Aug. 9, 1932 |
| 1,887,693 | Martin | Nov. 15, 1932 |
| 1,900,756 | Butts | Mar. 7, 1933 |
| 2,086,688 | Woodruff | July 13, 1937 |
| 2,268,332 | Gilpin | Dec. 30, 1941 |
| 2,394,229 | Bergstrom | Feb. 5, 1946 |